United States Patent
Von Keszycki

[11] 3,710,899
[45] Jan. 16, 1973

[54] VALVE FOR ANTI-SKID BRAKE CONTROL MECHANISM

[76] Inventor: Harald J. Von Keszycki, 5220 Collier Place, Los Angeles, Calif. 91364

[22] Filed: Aug. 8, 1969

[21] Appl. No.: 848,605

[52] U.S. Cl. ........................... 188/181 T, 303/21 CH
[51] Int. Cl. .............................................. B60t 8/00
[58] Field of Search ...188/152, 152.04, 181; 303/21, 303/24, 6, 84

[56] References Cited

UNITED STATES PATENTS

| | | | |
|---|---|---|---|
| 2,999,567 | 9/1961 | Adams | 188/181 |
| 3,369,635 | 2/1968 | Davis | 188/181 |
| 3,386,537 | 6/1968 | Watanabe | 188/181 |
| 3,404,758 | 10/1968 | Mortimer | 188/181 |
| 3,490,566 | 1/1970 | Von Keszycki | 188/181 |

Primary Examiner—Milton Buchler
Assistant Examiner—John J. McLaughlin
Attorney—Roger A. Marrs

[57] ABSTRACT

A valve for utilization in an automatic anti-skid brake control mechanism. The valve is activated by a change in the brake torque of a skidding vehicle wheel during the transition of the vehicle wheel from the rotating to the skidding condition. As the vehicle commences to skid, the valve causes the hydraulic pressure on the brake to be reduced, whereby the brake is automatically disengaged until the wheel again begins to rotate. Simultaneously, back pressure on the vehicle brake pedal is increased, temporarily forcing the pedal upward against the operator's foot, upon which occurrence braking pressure may then again be reapplied.

7 Claims, 2 Drawing Figures

PATENTED JAN 16 1973

3,710,899

INVENTOR.
HARALD J. VON KESZYCKI
BY
Roger A. Marrs

VALVE FOR ANTI-SKID BRAKE CONTROL MECHANISM

BACKGROUND OF THE INVENTION

1. Field of the Invention

This invention relates in general to a valve and more particularly, to a valve which can be utilized in a vehicle braking system for preventing permanent wheel locking when the brakes of a vehicle are applied to slow down or stop the vehicle.

2. Description of the Prior Art

It is well known that the greatest braking effect is secured when the wheels of a vehicle are turning rather than when they are locked and sliding upon the surface of a road. Likewise, the operator of a vehicle has maximum control of his vehicle when the tires have a high co-efficient of friction with the road or runway. Without this friction between the tires and the supporting surface, the vehicle will not respond in the usual manner to the steering mechanism or to the accelerator or brake. Control of the vehicle is consequently extremely difficult under these aforementioned conditions in that as a vehicle wheel skids, the road torque or wheel torque on that particular wheel is considerably reduced.

In bringing a moving vehicle to a stop, two kinds of friction must be considered, namely, static and sliding. Of these, the greater force is that of static friction, and in order to bring a vehicle to a stop in the shortest possible time a high co-efficient of static friction between the wheel treads and the road surface must be secured. This static friction is present when the wheels are rolling over the road so that in applying the vehicle brakes, the greatest effect is secured when the wheels are turning rather than when the wheels are locked and sliding upon the surface of the road.

When brakes are applied too strongly or too suddenly such as under emergency or panic conditions, the friction between the brake lining and the brake drum is so much greater than the friction between the tires and the pavement that the vehicle tires skid along the pavement and "lock" causing the vehicle to go out of control. This deceleration of the vehicle wheels caused by application of the brakes may occur in any one of the wheels because of the irregularity of the road surface or may occur because of an inherent characteristic in the braking system which produces an unbalanced retarding action resulting in a change in direction of movement of the vehicle.

For example, when the ground surface is coated with ice or snow, one wheel may hit a slick spot and with equal braking pressure on all wheels, only one wheel will start to skid, thereby throwing the whole vehicle into a dangerous slid in which the operator cannot control by steering. Often, the operator cannot tell when tires start to skid and cannot react quickly enough to decrease his application of braking force. Under these emergency conditions, the operator of a vehicle cannot resist putting all force at his command to stop the vehicle.

Many of the devices which have heretofore been proposed for the prevention of skidding have required an entire reconstruction of the braking system and are not suitable for installation on existing brakes by means of readily installed attachments. As indicated in my copending application, Ser. No. 657,569 entitled "Anti-Skid Brake Control," other previous systems have relied generally upon governors or massive inertia flywheels while still others have involved a complicated mechanism or complex electrical or hydraulic devices. Such devices increase the number of parts and the likelihood of failure and a mechanic cannot always readily understand or service them or visually observe a defect in them.

SUMMARY OF THE INVENTION

Therefore, the skidding problems and difficulties encountered which result from an uncontrollable wheel skid or "lock" and the inherent disadvantages of the prior art are overcome by the present invention in which a novel control valve is employed in any conventional, hydraulically controlled brake system operably disposed between the system's brake cylinders and the brake actuating means. In a preferred embodiment of the present invention, the control valve comprises a valve body having a hydraulic fluid input port and an output port internally communicated therein and a pair of substantially co-axially aligned apertures disposed through opposite sides of the valve body. The valve body also includes another pair of apertures intercommunicating the interior chamber of the housing to the exterior of the control valve.

A piston having a piston head of a diameter slightly less than the valve chamber is slideably mounted within said chamber or cylinder which is defined by the valve body and is free to move in a reciprocating manner therein. The piston head includes on each side of its piston faces, rod-like extension attached thereto which protrudes through said valve body via one of said co-axial apertures, the rods being in substantially co-axial relationship and extending divergently.

The piston faces have a plurality of apertures circumferentially disposed about said rods and extending through said piston head which provide fluid communication between the two sub-chambers of the chamber as separated by the piston head.

A resilient seal is carried by one of the rod-like extensions in abutting relation to one of the piston faces and extends circumferentially over and beyond the apertures in the piston face so as to uni-directionally limit fluid flow between the two sub-chambers.

The valve body further defines a fluid-carrying conduit which intercommunicates the input and output ports of the valve body and also a threaded aperture in substantially co-axial alignment with said conduit. An adjustment means threadedly engages the threaded aperture and is adapted so that it may be threadedly advanced into or retracted from said conduit whereby the amount of fluid which may be intercommunicated between the input and output ports is selectively restricted.

Under normal driving and braking conditions, the hydraulic fluid will flow in sufficient quantity through the valve conduit to stop the vehicle. Pressure applied to the brake pedal is sensed by the wheel cylinder causing movement of the brake shoes against the brake drum. During this time, the brake system will move in a clockwise manner against a spring, causing the valve piston to move a preselected distance towards the output port and allowing fluid to be interchanged from one sub-chamber to the other via the apertures in the piston face.

Upon the wheel beginning to slide, the decreased coefficient of friction in conjunction with the forces exerted by the spring move the brake backing plate in a sharp and violent counter-clockwise direction, causing the valve piston to move in a direction toward the input port with equal suddenness. During this movement, the exchange of fluid through the plurality of apertures in the piston is prohibited by the annular resilient seal causing the fluid to be forced back through the input port and against the brake pedal, simultaneously allowing only restricted fluid exchange to the output port through the valve conduit.

As a consequence, there is a reduction of pressure in the output port sub-chamber which is sensed by the wheel cylinder which causes the brake to release. As fluid is gradually forced through the valve conduit, the pressure in the output sub-chamber is again raised, resulting in the reapplication of the brakes.

Therefore, it is a primary object of the present invention to provide a novel anti-skid control valve for vehicle braking systems that is not only sensitive to emergency or panic braking conditions, but is automatically restored to its normal position upon the cessation of the skidding condition.

Another object of the present invention is to provide a braking system for vehicle wheels so arranged that while any desired braking force may be applied to the wheel, if the wheel ceases to rotate, the braking force will be relieved and rotation of the wheel restored immediately, whereby the vehicle will be brought to a stop in the shortest possible distance.

Another object of the present invention is to provide a braking system for vehicle wheels wherein the maximum braking effort may be applied to bring the vehicle to a stop.

It is another object of this invention to provide an anti-skid braking system comprising a piston-cylinder assemblage wherein the cylinder is immovably mounted on an axial housing or stub, and the piston is movably mounted and responsive to the movement of a brake reaction member for precisely controlling vehicle braking.

Another object of this invention is to provide a novel anti-skid control valve of the character described herein that incorporates a passage closure means operable in response to changes in the frictional forces produced by the vehicle wheels upon the roadway.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

DESCRIPTION OF THE PREFERRED EMBODIMENT

Figure 1:
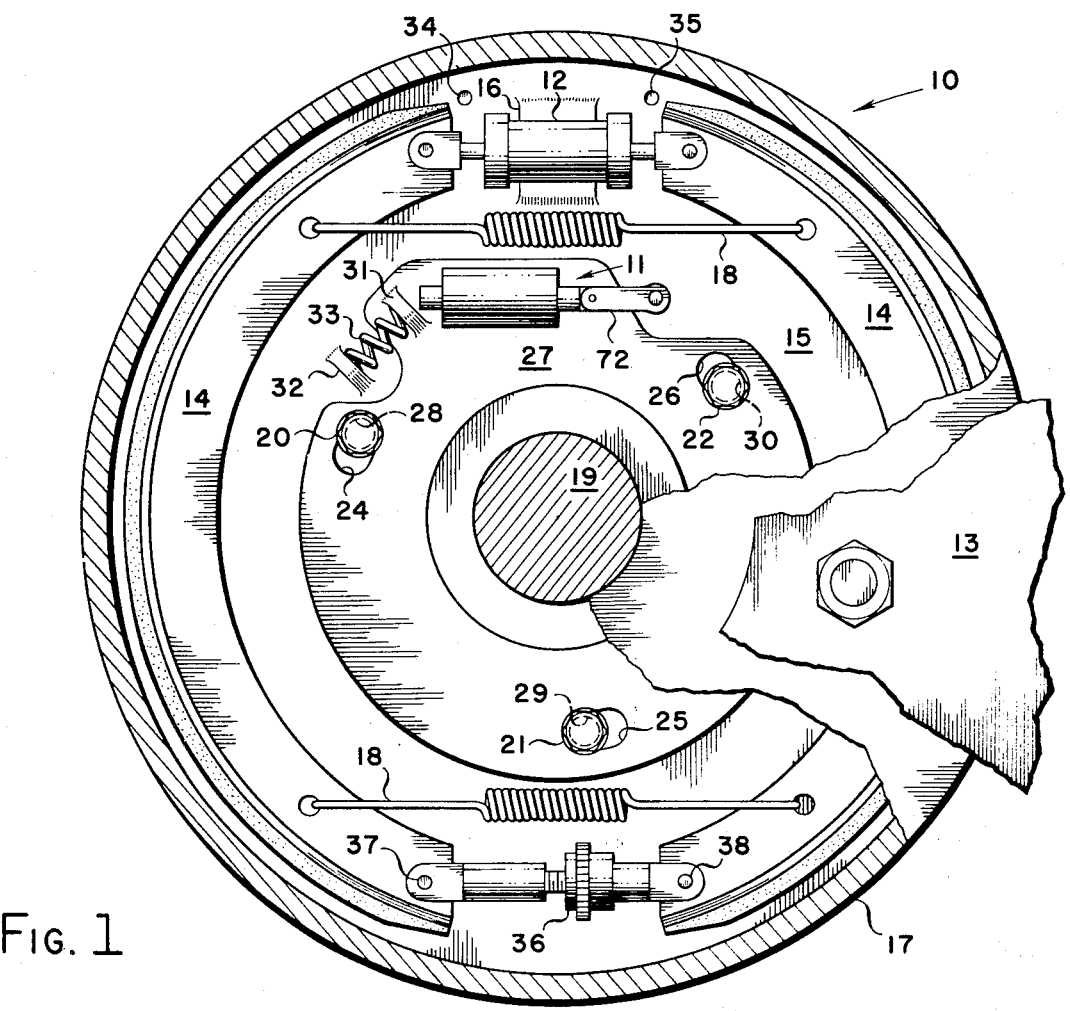
FIG. 1 is a side elevational view of the novel braking apparatus illustrating a pair of brake shoes mounted on the movable backing plate and the control valve operable in response to backing plate movement.

Referring to the drawings in detail and initially to FIG. 1 thereof, a brake system in accordance with the present invention for a vehicle is diagrammatically illustrated in the general direction of arrow 10 which employs a novel valve control mechanism 11 of the present invention.

The control mechanism 11 is illustrated in series with the brake hydraulic line and extending between and in fluid communication with a wheel cylinder 12 and a conventional brake actuating means (not shown). Under normal braking action, pressure is applied by the vehicle operator to the brake pedal whereby brake fluid pressure is exerted on the wheel cylinder 12. The wheel cylinder 12 is employed for braking a wheel 13 by means of expandable brake shoes 14. As fluid pressure is applied, the brake shoes 14, which are supported in any well known manner to a brake backing plate 15 such as by a bracket 16 and cylinder 12, are moved into restricting relationship with the interior surface of a brake drum 17. The rotating wheel 13 is thereupon decelerated until it and the vehicle has stopped. As the hydraulic pressure is relieved by the vehicle operator's release of the brake pedal, return springs 18 restore the brake shoes 14 to their disengaged position and, thereby, free the wheel 13 for further rotative movement.

It is to be understood, however, that although the control mechanism 11 is employed and depicted in controlling one wheel only, it may likewise be employed to control all of the vehicle wheels simultaneously or just a selected combination thereof such as the front steering wheels.

The brake backing plate 15 is pivotally mounted to an axial housing 19 and retained by means of conventional fasteners 20–22, such that the brake backing plate 15 may rotate within a preselected arcuate distance determined by the terminating ends of slots 24–26. The axle housing 19 has a flanged section 27 having a plurality of apertures 28–30 therethrough which register with the slots 24–26 when the plate 15 is mounted upon the housing 19.

A spring-receiving member 31 disposed upon the flanged section 27 is in substantial alignment with a similar spring member 32 on the brake backing plate 15, both said members 31 and 32 being adapted to receive opposite terminating ends of a compression spring 33.

The relative movement of the brake backing plate 15 to the axle housing 19 therefore is controlled by the terminating ends of the slots 24–26 and the biasing effect produced by the spring 33.

A conventional adjustment means 36 is pivotally connected to the brake shoes 14 by fasteners 37 and 38 and permits the brake shoes 14 to be selectively regulated in their relative distance from the brake drum 17.

Figure 2:
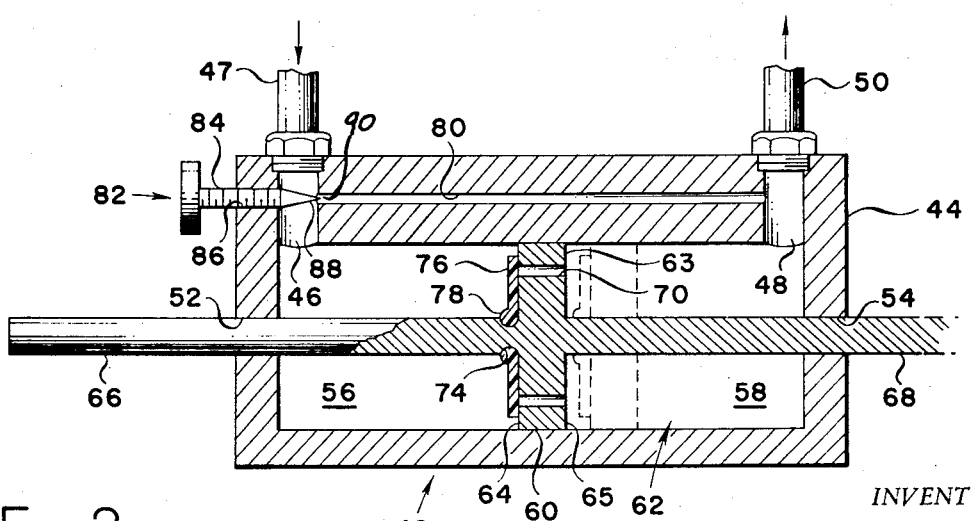
FIG. 2 is an enlarged sectional view of the control valve shown in FIG. 1.

Referring now more specifically to FIG. 2, a control valve 42, representing the control mechanism 11 of FIG. 1, is shown in cross-section so that the parts and components thereof are more clearly illustrated. The control valve 42 includes a valve body or cylinder 44 secured to the flange 27 which is itself rigidly mounted to the axle housing 19. The valve body 44 includes an input port 46 in fluid communication with the brake actuating means via a conduit 47 and an output port 48 in fluid communication with the wheel cylinder 12 by means of a conduit 50. The valve body 44 also includes apertures 52 and 54 which intercommunicate the input and output sub-chambers 56 and 58 respectively to the exterior of the control valve 42.

A piston 60 slideably disposed within cylinder or chamber 62, as defined by the valve body 44, is free to move in a reciprocal manner therein.

The piston 60 comprises a piston head 63 defining piston faces 64 and 65 and includes piston rods 66 and 68 in substantially divergent co-axial relationship. The piston head 63 includes a plurality of circumferentially disposed apertures 70 therethrough, the apertures intercommunicating the sub-chambers 56 and 58. The piston rods 66 and 68 are rigidly attached on piston faces 64 and 65 respectively of the piston head 63 and protrude through the apertures 52 and 54 respectively. The rod 66 is free at its end opposite the piston head 63 while the rod 68 is pivotally mounted to the brake backing plate 15 via linkage 72. A circumferential groove 74 defined by the rod 66 is adjacent the piston face 64 and is adapted to receive the anchoring portion of a resilient seal 76. The seal 76 is itself substantially toroidal and is removably mounted upon the piston rod 66. The seal 76 comprises a ring-like interdiameter 78 adapted to nest or anchor in the groove 74 and extends radially outward such that it completely covers the circumferentially disposed apertures 70 in the piston head 63.

A conduit 80 disposed intermediate the input port 46 and output port 48, is defined by a section of the valve body 44 and is adapted to receive and carry fluid between the said ports.

A fluid-flow regulator means 82 is disposed in substantially co-axial alignment with the conduit 80 and comprises a threaded shank portion 84 which is adapted to threadedly engage the valve body 44 via a threaded aperture 86 therein. The shank 84 has a pointed or conical end 88 whose base diameter is larger than the diameter of said conduit and which may be selectively advanced or retracted from the end 90 of the conduit 80. As a result, the quantity of fluid permitted to flow into the conduit may be regulated to any desired amount.

In operation then the novel braking system 10 of the present invention will work in the following manner. Under normal braking or driving conditions, hydraulic fluid is allowed to flow into the input port 46 of the control valve 42 via the conduit 47. Fluid present within the input port 46 is introduced to the output port 48 via the conduit 80 and is thereafter supplied to the wheel cylinder 12 through the conduit 50. As pressure is applied to the brake pedal, it is sensed by the wheel cylinder 12 causing movement of the brake shoes 14 against the brake drums 17. During this time, the brake system 10 will move in a clockwise manner. As it does, the piston 60 will move toward the output port 48 as shown by dotted lines and the apertures 70 through the piston 60 and the resilient seal 76 allow fluid to be unidirectionally exchanged from the sub-chamber 58 to the sub-chamber 56. As the wheel 13 begins to slide, the decreased co-efficient of friction in conjunction with the force exerted by the spring 33 moves the brake backing plate 15 in a sharp and violent counter-clockwise direction, thereby moving the piston 60 toward the input port 46 with equal suddenness. During this movement, however, exchange of fluid through the apertures 70 in the piston head 63 is prohibited by the resilient seal 76 bearing against the head 63. This causes the fluid to be forced back through the input port 46 and conduit 47 and against the brake actuating means (master cylinder piston) while allowing only restricted fluid exchange into the sub-chamber 58 through the passage 80 and output port 48. This results in momentary reduction of pressure in the sub-chamber 58 which is sensed by the wheel cylinder 12 through the conduit 50, thereby resulting, in turn, in brake release. As fluid is gradually forced through the restricted passage 90, the pressure in sub-chamber 58 is again raised causing reapplication of the brakes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby said brake backing means depressurizes said brake cylinder while simultaneously inhibiting reapplication of fluid pressure from said operator controlled means to said brake cylinder during wheel skid, and simultaneously causing pressure against said source of fluid pressure;

said valve means comprising:

a valve body defining a valve chamber;

an input port operably connected to said source of fluid pressure;

an output port operably connected to said brake actuating means;

piston means slideably mounted interiorly of said valve body and intermediate said input port and said output port and dividing said valve chamber into an input sub-chamber and an output sub-chamber and being movably responsive to changes in wheel brake torque; and fluid flow restricting means carried by said piston to directionally restrict fluid flow;

said piston means comprising:

a piston head; and first and second piston rods in opposing relation, each fixedly secured at one of its ends to an opposing piston head face, said first piston rod extending exteriorly on said valve body via an aperture therethrough and being free at its other end and said second piston rod also extending exteriorly on said valve body via an aperture therethrough and being operably connected to said brake backing plate at its other end.

2. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby said brake backing means depressurizes said brake cylinder while simultaneously inhibiting reapplication of fluid pressure from said operator controlled means to said brake cylinder during wheel skid, and simultaneously causing pressure against said source of fluid pressure;

said valve means comprising:

a valve body defining a valve chamber;

an input port operably connected to said source of fluid pressure;

an output port operably connected to said brake actuating means;

piston means slideably mounted interiorly of said valve body and intermediate said input port and said output port and dividing said valve chamber into an input sub-chamber and an output sub-chamber and being movably responsive to changes in wheel brake torque; and fluid flow restricting means carried by said piston to directionally restrict fluid flow;

said fluid flow regulating means comprising:

at least one aperture through said piston head intercommunicating said input sub-chamber and said output sub-chamber; and a resilient seal carried by said first piston rod and extending over said apertures, said seal permitting only fluid flow from said output sub-chamber to said input sub-chamber.

3. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby said brake backing means depressurizes said brake cylinder while simultaneously inhibiting reapplication of fluid pressure from said operator controlled means to said brake cylinder during wheel skid, and simultaneously causing pressure against said source of fluid pressure;

said valve means comprising:

a valve body defining a valve chamber;

an input port operably connected to said source of fluid pressure;

an output port operably connected to said brake actuating means;

piston means slideably mounted interiorly of said valve body and intermediate said input port and said output port and dividing said valve chamber into an input sub-chamber and an output sub-chamber and being movably responsive to changes in whell brake torque; and fluid flow restricting means carried by said piston to directionally restrict fluid flow;

a conduit means intercommunicating said input port and said output port whereby fluid is supplied from said source of fluid pressure to said brake cylinders;

fluid flow regulating means carried by said valve body and selectively limiting the fluid flow between said input port and said conduit means and said output port; and said fluid flow regulating means comprising:

a screw threadedly engaging a threaded aperture in said valve body.

4. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby as said brake backing means depressurizes said brake cylinder while simultaneously inhibiting reapplication of fluid pressure from said operator controlled means to said brake cylinder during wheel skid;

a pulse generation means included in said valve means for causing a reverse pressure pulse to be applied against said source of fluid pressure thereby counteracting pressure on said operator controlled means for simultaneously providing the operator with a warning that said vehicle wheels have temporarily locked;

a valve body defining a valve chamber;

an input port operably connected to said source of fluid pressure;

an output port operably connected to said brake actuating means;

a piston slidably mounted interiorly of said valve body and intermediate said input port and said output port and dividing said valve chamber into an input sub-chamber and an output sub-chamber and being movably responsive to changes in wheel brake torque to provide brake release while generating said back pressure pulse without depletion of high pressure fluid;

fluid flow restricting means carried by said piston to directionally restrict fluid flow;

said piston comprising a piston head; and first and second piston rods in opposing relation, each fixedly secured at one of its ends to an opposing piston head face, said first piston rod extending exteriorly on said valve body via an aperture therethrough and being free at its other end and said second piston rod also extending exteriorly on said valve body via an aperture therethrough and being operably connected to said brake backing plate at its other end.

5. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby as said brake backing means depressurizes said brake cylinder while simultaneously inhibiting reapplication of fluid pressure from said operator controlled means to said brake cylinder during wheel skid;

a pulse generation means included in said valve means for causing a reverse pressure pulse to be applied against said source of fluid pressure, thereby counteracting pressure on said operator controlled means for simultaneously providing the operator with a warning that said vehicle wheels have temporarily locked;

a valve body defining a valve chamber;

an input port operably connected to said source of fluid pressure;

an output port operably connected to said brake actuating means;

a piston slidably mounted interiorly of said valve body and intermediate said input port and said output port and dividing said valve chamber into an input sub-chamber and an output sub-chamber and being movably responsive to changes in wheel brake torque to provide brake release while generating said back pressure pulse without depletion of high pressure fluid;

fluid flow restricting means carried by said piston to directionally restrict fluid flow;

said fluid flow regulating means comprising at least one aperture through said piston head intercommunicating said input sub-chamber and said output sub-chamber; and a resilient seal carried by said first piston rod and extending over said apertures, said seal permitting only fluid flow from said output sub-chamber to said input sub-chamber.

6. In an anti-skid brake control apparatus for controlling the application of the brakes to a revolving wheel on a vehicle having an axle housing or stud, a source of fluid pressure, an operator controlled means for regulating the pressure delivered from said source of fluid pressure, a brake cylinder arranged for pressurization by said source of fluid pressure, a brake backing means pivotally connected to said axle housing or axle stud, the improvement comprising:

valve means disposed intermediate and in fluid communication with said source of fluid pressure and said brake cylinder, said valve means being responsive to said brake backing means whereby as said brake backing means depressurizes said brake cylinder while simultaneously inhibiting reapplication of fluid pressure from said operator controlled means to said brake cylinder during wheel skid;

a pulse generation means included in said valve means for causing a reverse pressure pulse to be applied against said source of fluid pressure, thereby counteracting pressure on said operator controlled means for simultaneously providing the operator with a warning that said vehicle wheels have temporarily locked;

said valve means comprising a valve body defining a valve chamber;

an input port operably connected to said source of fluid pressure;

an output port operably connected to said brake actuating means;

a piston slideably mounted interiorly of said valve body and intermediate said input port and said output port and dividing said valve chamber into an input sub-chamber and an output sub-chamber and being movably responsive to changes in wheel brake torque to provide brake release while generating said back pressure pulse without depletion of high pressure fluid;

fluid flow restricting means carried by said piston to directionally restrict fluid flow;

the device including a permanently open conduit means intercommunicating said input port and said output port whereby fluid is supplied from said source of fluid pressure to said brake cylinders;

fluid flow regulating means carried by said valve body and selectively limiting the fluid flow between said input port and said conduit means and said output port; and fluid flow regulating means comprising a screw threadedly engaging a threaded aperture in said valve body.

7. The device of claim 6 wherein said fluid flow regulating means includes a pointed terminating end opposite its head adapted for insertion into the entrance of said conduit means.

* * * * *